United States Patent

Premiski et al.

[11] Patent Number: 5,658,215
[45] Date of Patent: Aug. 19, 1997

[54] PLANET PINION OR GEAR CARRIER

[75] Inventors: Vladimir Premiski, Zuelpich Buervenich; Mark Silk; Zoltan Brassai, both of Cologne; Wilhelm Wehren, Kerpen/Blatzheim, all of Germany

[73] Assignee: Ford Motor Company, Dearborn, Mich.

[21] Appl. No.: 435,258

[22] Filed: May 5, 1995

[30] Foreign Application Priority Data

Jun. 23, 1994 [DE] Germany .......................... 44 21 931.8

[51] Int. Cl.⁶ .................................................. F16H 57/08
[52] U.S. Cl. ........................................ 475/331; 29/509
[58] Field of Search .............................. 475/331, 346; 403/274, 278, 279, 281; 29/505, 509

[56] References Cited

U.S. PATENT DOCUMENTS

| | | | |
|---|---|---|---|
| 1,138,968 | 5/1915 | Neill | 475/331 |
| 1,299,156 | 4/1919 | Fast | 475/331 |
| 1,820,061 | 8/1931 | Flagg | 475/331 |
| 3,039,798 | 6/1962 | Carlson et al. | 29/509 |
| 3,472,083 | 10/1969 | Schnepel | 475/331 |
| 4,043,021 | 8/1977 | Mosbacher et al. | 475/331 |
| 4,674,360 | 6/1987 | Matoba | 475/331 |
| 4,713,983 | 12/1987 | Rundle | 475/206 |
| 4,901,602 | 2/1990 | Matoba | 475/331 |
| 5,209,707 | 5/1993 | Teraoka | 475/249 |

FOREIGN PATENT DOCUMENTS

| | | | |
|---|---|---|---|
| 25 03 518 | 1/1975 | Germany | 475/331 |
| 26 05 230 | 7/1977 | Germany | 475/331 |
| 36 03 401 | 7/1989 | Germany | 475/331 |

*Primary Examiner*—Charles A. Marmor
*Assistant Examiner*—Sherry Lynn Estremsky
*Attorney, Agent, or Firm*—Frank G. McKenzie

[57] ABSTRACT

In a planet carrier (1) comprising two carrier parts (2 and 3), connected together axially, at least one of which is provided with axially extending posts (8) and the other with fitting openings (12) corresponding to the posts (8), and wherein the posts (8) engage in the openings (12) in a form-fitting manner and in addition are connected to one another, the posts (8) extending axially from the one carrier part (2) have a triangular cross-section making use of the maximum amount of free space; the posts (8) are provided at their ends facing the fitting openings (12) with a step (10) of height substantially corresponding to the thickness of the other carrier part (3) in the region of the openings (12); and the fitting openings (12) formed in the other carrier part (3) have a triangular shape (11) cut back by a radius (9), which is connected to the openings (12) by a force fit.

4 Claims, 4 Drawing Sheets

PLANET PINION OR GEAR CARRIER

BACKGROUND OF THE INVENTION

1. Field of the Invention

The invention relates to the field of planetary gearing for an automatic transmission, particularly to the carrier that rotatably supports planet pinions.

2. Description of the Prior Art

A planet carrier of this kind is known from DE-OS 25 03 518. This known planet carrier has the disadvantage that both carrier parts are only made of sheet metal parts, which, for example, places considerable restrictions on the cross-section of the posts, as a result of which, when loads are particularly high, it is no longer possible to use such a planet carrier.

From DE-PS 26 05 230 a planet carrier is known in which the two axially connected carrier parts are made as castings or forgings. This gives greater freedom for the selection of the form of the posts so that such a planet carrier can also be used for highly loaded planet carriers.

However, this known planet carrier has the disadvantage that here, too, the posts again have a substantially arcuate rectangular section, which cannot be so highly loaded in the radial direction.

From DE-PS 36 03 401 a planet carrier comprising two axially connected carrier parts is known in which the carrier parts are made as forgings, and where, in addition, the posts have a substantially triangular cross-section, which can transmit considerable forces both in the circumferential and in the radial directions. Here, however, the cross-section of the posts is weakened by axial bores provided to receive bolts connecting the two carrier parts.

SUMMARY OF THE INVENTION

It is an object of the invention to improve a planet carrier of the kind referred to above so that it will withstand very high loads while occupying only a small volume.

To this end, according to the invention, in a planet carrier of the kind referred to, the axially extending posts on one carrier part have a triangular cross-section making use of the maximum amount of free space; the posts are provided at their ends facing the fitting openings with a step of height corresponding to about the thickness of the other carrier part in the region of the openings; the fitting openings formed in the other carrier part have a cut-back triangular shape substantially corresponding to the posts as cut back by the step; and the cut-back triangular shape of the posts is adapted to be connected to the openings by a force fit.

In an embodiment of the invention, the one carrier part is formed as a precision forging and the other carrier part by sintering, and the force fit between the cut-back triangular shape and the openings is provided without further mechanical working.

In another embodiment of the invention, the force fit between the cut-back triangular shapes and the openings in the two carrier parts is secured by subsequent deformation, such as by peening, prying or wedging over of the free ends of the cut-back triangular shapes.

DESCRIPTION OF THE PREFERRED EMBODIMENT

Figure 1:
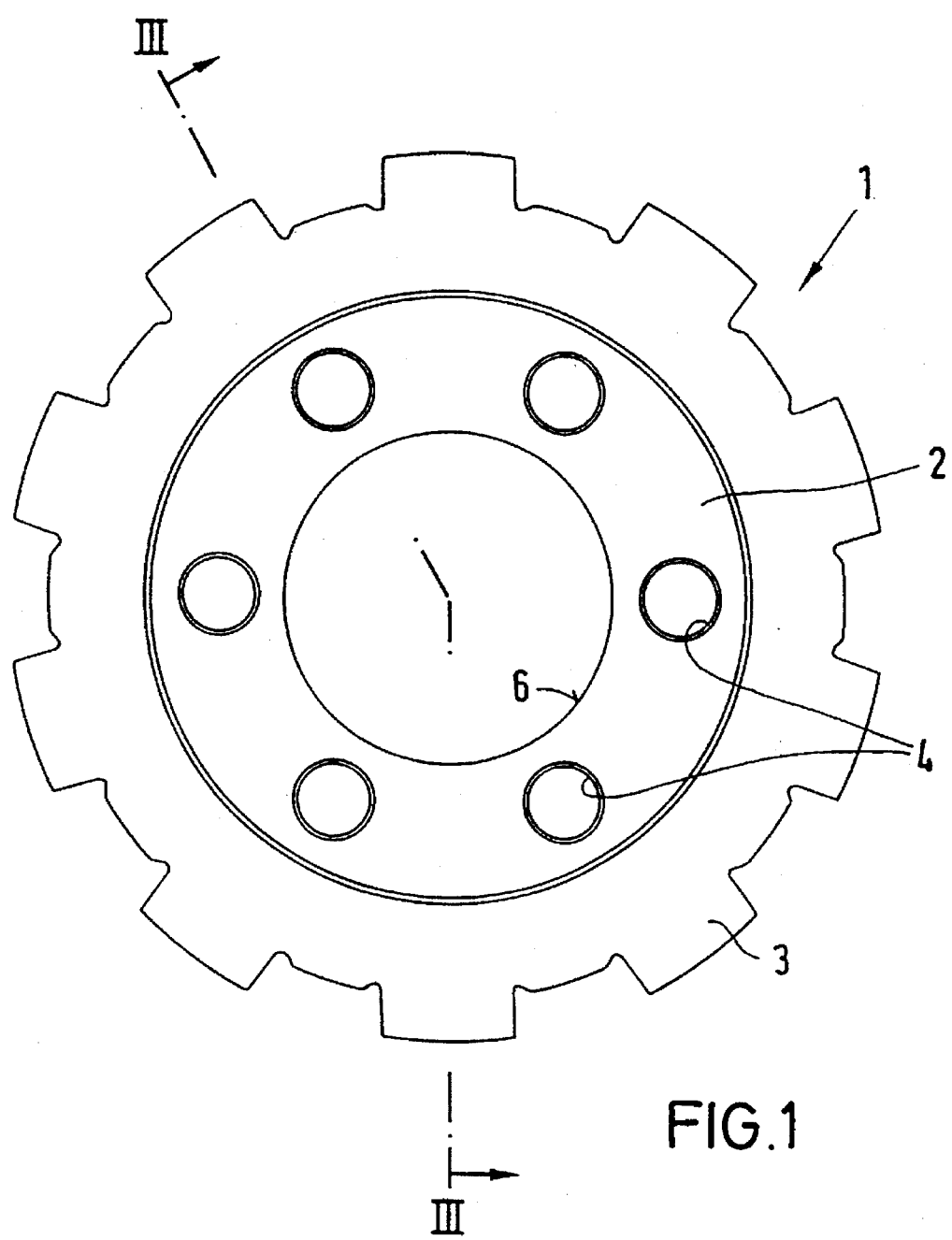
FIG. 1 shows an axial view from one side of a planet carrier in accordance with the invention.
Figure 2:
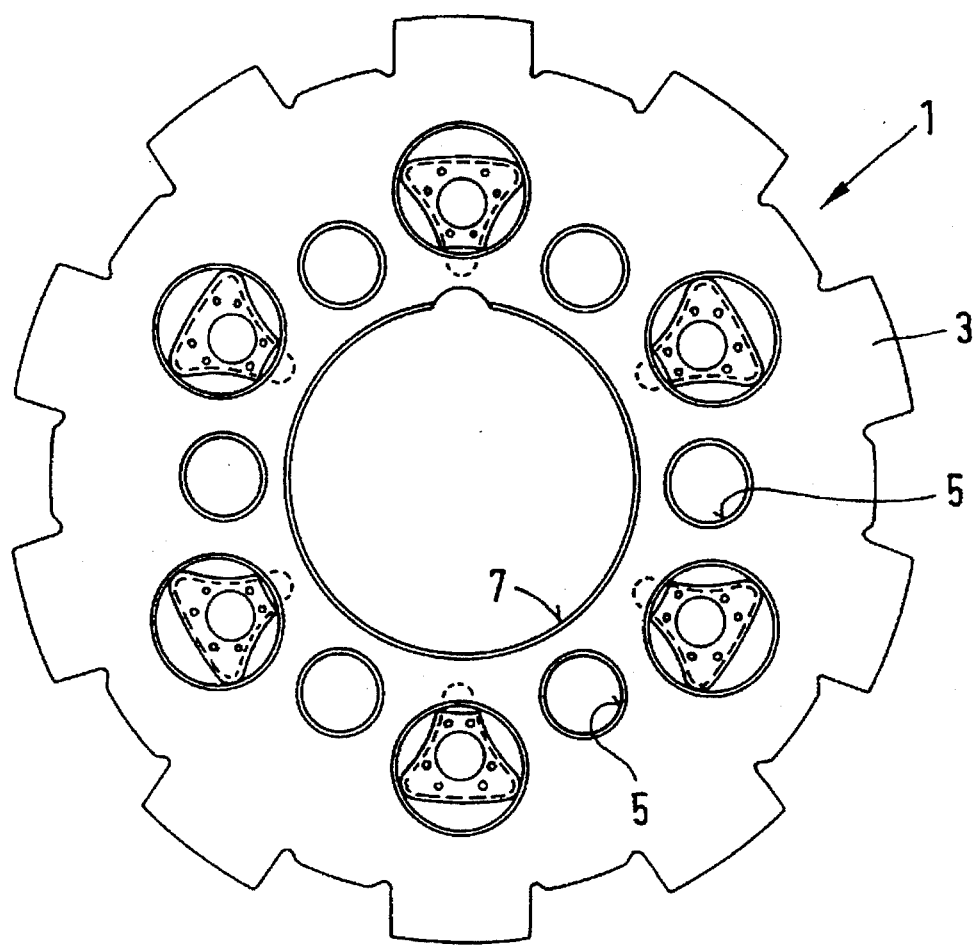
FIG. 2 shows an axial view from the other side of the planet carrier of FIG. 1.
Figure 3:
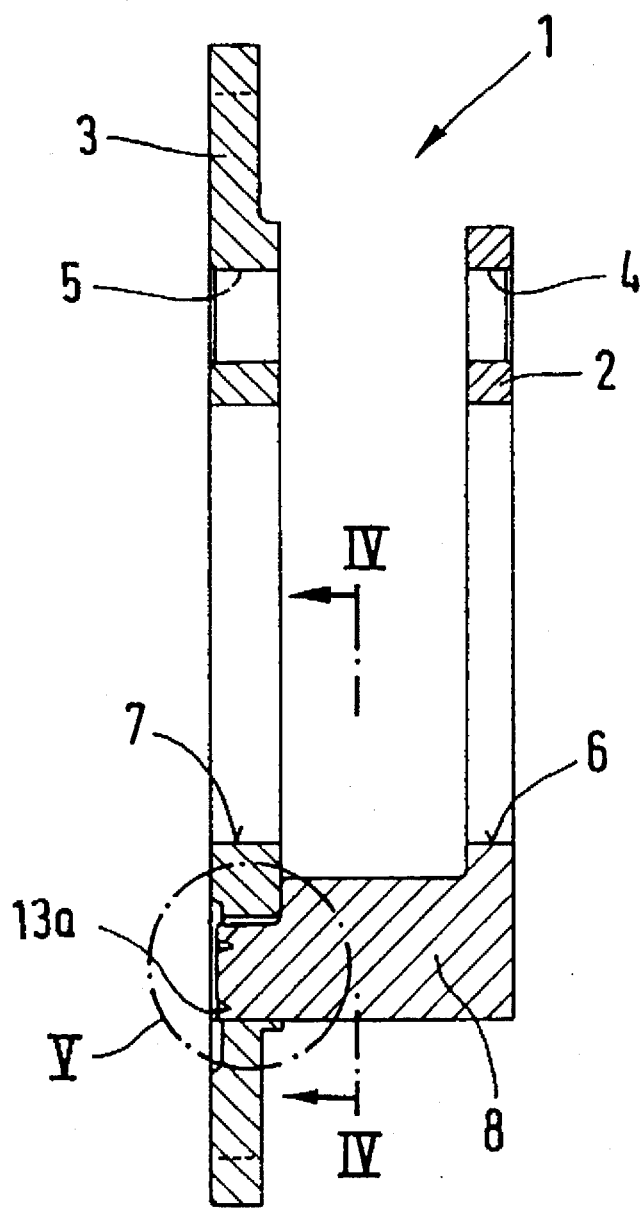
FIG. 3 is a section along the plane III—III in FIG. 1.

The planet carrier 1, shown in FIGS. 1 to 3, consists essentially of two carrier parts 2 and 3 connected together axially, of which the one part 2 is, for example, in the form of a precision forging and the other part 3 is a sintered part.

The carrier parts 2 and 3 are each provided in the usual way with fitting bores, 4 and 5, respectively, to receive planet shafts (not shown) on which the planets are rotatably mounted in needle bearings in the conventional way and are supported by way of lateral thrust washers.

The carrier parts 2 and 3 are also provided with the usual center bores, 6 and 7, respectively, which are required for gear shafts (not shown) to pass through.

The connection of the two carrier parts 2 and 3 in accordance with the invention, as emphasized in the circle V shown as a chain line in FIG. 3, will be explained in more detail in connection with FIGS. 4 to 6, in which this connection is shown on a larger scale.

Figure 4:
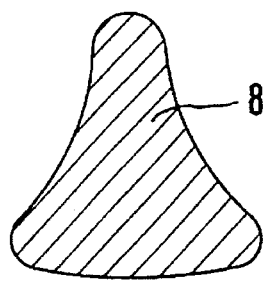
FIG. 4 is a section along the plane IV—IV in FIG. 3.

As can also been seen from FIG. 3, the carrier part 6 is provided with a plurality of posts 8, of which the section, as can be seen from FIG. 4, is substantially a triangle, of which the sides are formed by circular arcs and the corners are rounded off so that the arcs face towards the planets which are to be accommodated.

Figure 6:
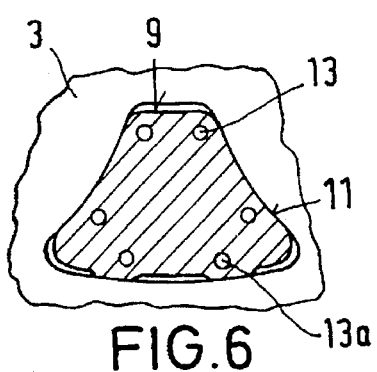
FIG. 6 is a section along the plane VI—VI in FIG. 5.
Figure 5:
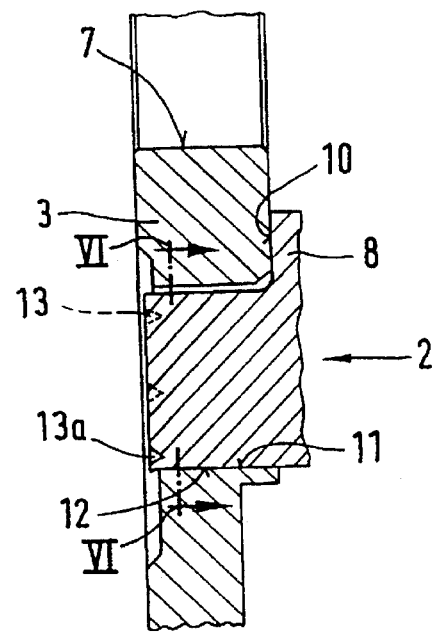
FIG. 5 is a view on a larger scale of the connection defined by circle V in FIG. 3.

The triangular posts 8 are, as can be seen from FIGS. 5 and 6, cut back along an arc 9 so as to exhibit a step 10, by which the precise distance between the two carrier parts 2 and 3 is determined.

The cut-back triangular shape 11, remaining on the posts 8 of the carrier part 2, substantially corresponds to a similarly shaped opening 12 in the carrier part 3.

At certain points, the cut-back triangular shape 11 is oversize relative to the opening 12 so that they can only be put together with a tight force-fit.

Making the one carrier part 2 as a precision forging and the other carrier part 3 as a sintered part enables this force fit to be provided without further mechanical working.

In addition to this tight force-fit between the two carrier parts 2 and 3, the projecting region of the cut-back triangular shape 11 can be secured by deformation, such as by peening, prying, or wedging over, at 13 and 13a.

By the avoidance of welds in the region of the carrier parts, heat distortion and possible stress concentrations are avoided.

The triangular cross-section, not weakened by any axial bores, both of the posts 8 and of the connecting region 11, makes for a reliable, form-fitting connection between the two carrier parts 2 and 3 and for optimal transmission of force in both the circumferential and radial directions.

It is understood that although the form of the invention shown and described herein constitutes the preferred embodiment of the invention, it is not intended to illustrate all possible forms thereof. It will also be understood that words used are words of description rather than a limitation, and that various changes may be made without departing from the spirit and scope of the invention as disclosed.

What is claimed is:

1. A planet carrier (1) comprising:

a first carrier part (3) having openings (12) mutually spaced about a central axis, each opening having a triangular shape, said triangular shade having arcuate concave lateral surfaces; and a second carrier part (2) connected to the first carrier part, having axially extending posts (8), each post having a free end located adjacent a corresponding opening, each post (8) and the corresponding opening (12) secured by deformation of the free end of each post at spaced predetermined, localized areas, engaging in said opening in a form-fitting manner, having an end facing said opening, having a step (10) located adjacent said end and facing the first carrier part, each post having a triangular shape (11) substantially corresponding in shape and size to the shape and size of a portion of the post (8) that is fitted within the corresponding opening.

2. The planet carrier of claim 1 wherein:

each post has a step whose height substantially corresponds to the thickness of the first carrier part (3) in the region of the openings.

3. The planet carrier according to claim 1 wherein:

the second carrier part (2) is formed as a precision forging, and the first carrier part (3) is formed by sintering.

4. A planet carrier according to claim 1 wherein each post has a free end located adjacent the corresponding opening, and the force fit between each post (8) and the corresponding opening (12) is secured by deformation of the free end of each post.

* * * * *